US009115754B2

(12) United States Patent
Einbock et al.

(10) Patent No.: US 9,115,754 B2
(45) Date of Patent: Aug. 25, 2015

(54) SUPPORT PLATE FOR BEARINGS

(71) Applicant: Robert Bosch GmbH, Stuttgart (DE)

(72) Inventors: Stefan Einbock, Stuttgart (DE); Vincent Riou, Ludwigsburg (DE); Ruediger Schroth, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/280,090

(22) Filed: May 16, 2014

(65) Prior Publication Data

US 2014/0245591 A1 Sep. 4, 2014

Related U.S. Application Data

(63) Continuation of application No. 13/121,705, filed as application No. PCT/EP2009/062516 on Sep. 28, 2009, now abandoned.

(51) Int. Cl.

| F16L 3/08 | (2006.01) |
|---|---|
| F16C 35/00 | (2006.01) |
| F16C 33/76 | (2006.01) |
| F16C 35/067 | (2006.01) |
| H02K 5/173 | (2006.01) |

(52) U.S. Cl.
CPC ............... *F16C 35/00* (2013.01); *F16C 33/76* (2013.01); *F16C 35/067* (2013.01); *H02K 5/1732* (2013.01); *Y10T 29/49947* (2015.01)

(58) Field of Classification Search
USPC ............ 248/224.8, 223.21, 225.11, 909; 384/220, 296, 428, 125, 215, 585, 44; 74/606 R; 52/98; 33/56; 310/89
See application file for complete search history.

(56) References Cited

U.S. PATENT DOCUMENTS

| RE24,371 E | 10/1957 | Fuge |
|---|---|---|
| 3,194,615 A | 7/1965 | Weasler |
| 3,319,484 A | 5/1967 | Prest |
| 3,431,032 A | 3/1969 | Haentjens |
| 3,745,391 A | 7/1973 | Dochterman |
| 3,758,799 A | 9/1973 | Dochterman et al. |
| 3,771,846 A | 11/1973 | Bass et al. |
| 3,818,255 A * | 6/1974 | Wagner .......................... 310/50 |
| 3,929,392 A | 12/1975 | Ogino |
| 4,212,098 A | 7/1980 | Sand |
| 4,638,608 A | 1/1987 | Coy |

(Continued)

FOREIGN PATENT DOCUMENTS

| DE | 10355363 | 6/2005 |
|---|---|---|
| DE | 10355398 | 7/2005 |

(Continued)

OTHER PUBLICATIONS

PCT/EP2009/062516 International Search Report dated Nov. 5, 2009 (3 pages).

*Primary Examiner* — Monica Millner
(74) *Attorney, Agent, or Firm* — Michael Best & Friedrich LLP

(57) ABSTRACT

A support device and method for fixing a bearing on a bearing shield of a housing of an electric machine. Rotatably mounted in the support device is a rotor with a shaft. The support device is substantially flat and comprises a plurality of fastening openings that are grouped about a central opening. The support device comprises at least one design break point that acts to provide a local limit to the excess stress in the material of the support device.

9 Claims, 4 Drawing Sheets

(56) References Cited

U.S. PATENT DOCUMENTS

| | | | |
|---|---|---|---|
| 4,756,632 A | 7/1988 | Belanger | |
| 4,933,581 A * | 6/1990 | Shramo | 310/86 |
| 5,145,265 A | 9/1992 | Flem | |
| 5,194,772 A | 3/1993 | Matsushita | |
| 5,476,326 A | 12/1995 | Ueno et al. | |
| 5,505,545 A | 4/1996 | Mergler | |
| 5,531,524 A | 7/1996 | Brouwer | |
| 5,678,932 A | 10/1997 | Cohn | |
| 5,733,050 A | 3/1998 | Diepolder et al. | |
| 5,887,982 A | 3/1999 | Wilcher | |
| 6,113,275 A | 9/2000 | Blase | |
| 6,122,995 A | 9/2000 | Gievers et al. | |
| 6,304,012 B1 * | 10/2001 | Chen et al. | 310/58 |
| 6,402,469 B1 | 6/2002 | Kastl et al. | |
| 6,412,985 B1 | 7/2002 | Schweitzer et al. | |
| 6,710,485 B2 | 3/2004 | Steuer et al. | |
| 6,897,592 B2 | 5/2005 | Suzuki et al. | |
| 6,902,452 B1 | 6/2005 | Knight | |
| 7,077,573 B2 | 7/2006 | Suh et al. | |
| 7,091,642 B2 | 8/2006 | Agnes et al. | |
| 7,228,641 B2 | 6/2007 | Hunter et al. | |
| 7,239,056 B1 | 7/2007 | Griggs et al. | |
| 7,341,134 B2 | 3/2008 | Buhrke | |
| 2005/0184604 A1 | 8/2005 | Ooiwa | |
| 2005/0184610 A1 | 8/2005 | Agnes et al. | |
| 2007/0210658 A1 | 9/2007 | Terauchi et al. | |
| 2007/0241629 A1 | 10/2007 | Ionel et al. | |
| 2007/0278870 A1 | 12/2007 | Olkanen et al. | |
| 2008/0164784 A1 | 7/2008 | Huang | |
| 2008/0226209 A1 | 9/2008 | Plona | |
| 2010/0164333 A1 | 7/2010 | Uchimura et al. | |

FOREIGN PATENT DOCUMENTS

| | | |
|---|---|---|
| DE | 102004053078 | 5/2006 |
| EP | 0346690 | 12/1989 |
| GB | 2286513 | 8/1995 |
| WO | 03081750 | 10/2003 |

* cited by examiner

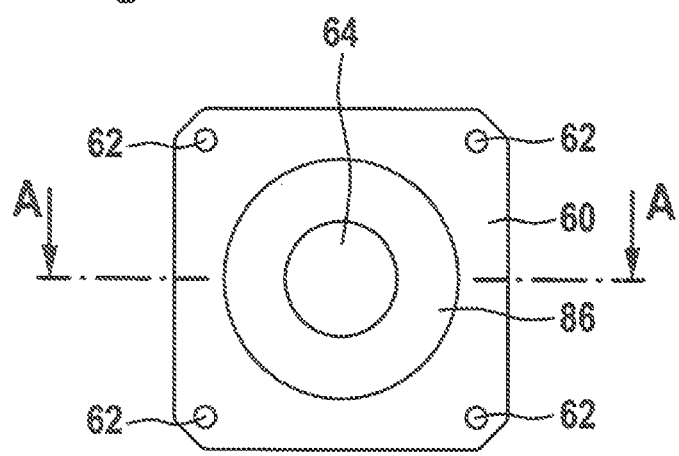
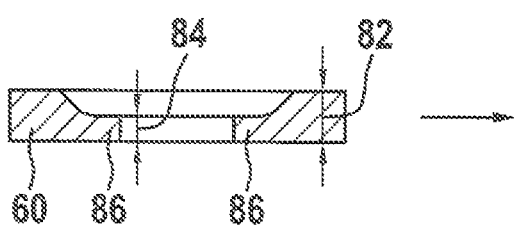
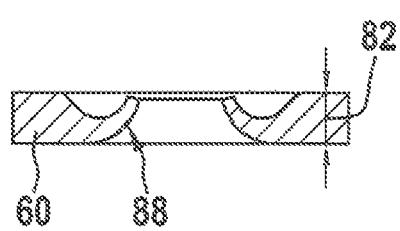

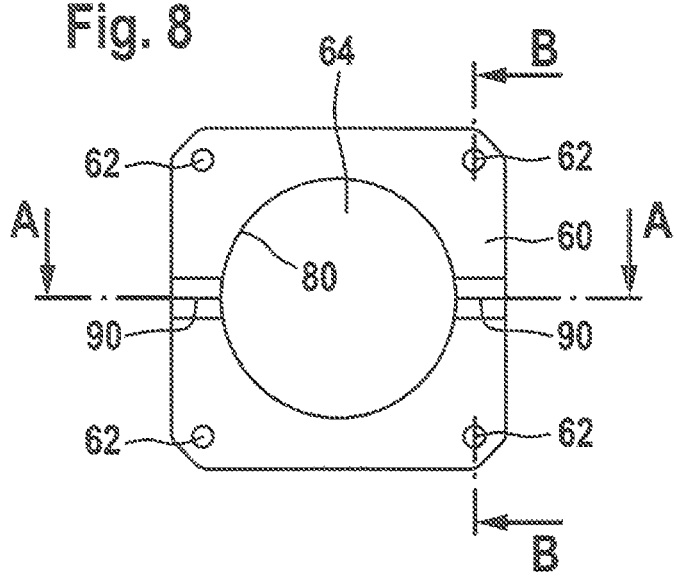
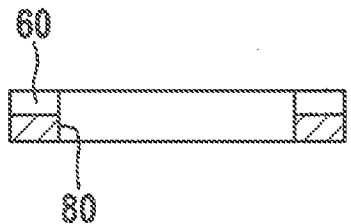 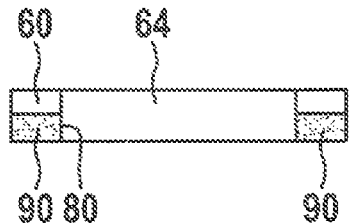
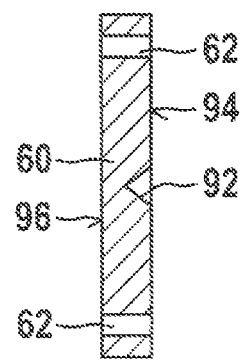 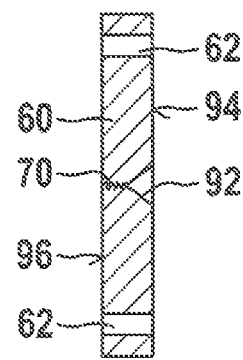

SUPPORT PLATE FOR BEARINGS

CROSS-REFERENCE TO RELATED APPLICATIONS

This application is a continuation of U.S. patent application Ser. No. 13/121,705, filed May 10, 2011, which is a U.S. national phase filing of PCT/EP2009/062516, filed Sep. 28, 2009, which claims priority to German Patent Application 10 2008 042 552.4, filed Oct. 2, 2008.

BACKGROUND OF THE INVENTION

As a rule, air-cooled generators for applications in the automotive sector are mounted by means of a locating bearing in a first bearing plate (A bearing plate) and a floating bearing in a second bearing plate (B bearing plate). A ball bearing which is used as a bearing is fixed axially here between a bearing plate and a support plate. As a result of the generally present bearing play, oscillations of the rotor occur as overall body in the axial direction. This phenomenon which is also called rotor bouncing occurs as a rule between 100 Hz and 500 Hz and is generally associated with very high mechanical loadings in the generator on various components.

DE 44 03 957 A1 relates to a flange bearing. Said flange bearing serves to receive a prong shaft of the winch or the pick-up drum of a harvester or of another correspondingly equipped agricultural machine. The flange bearing comprises a bearing body which is divided on one side and the outer casing of which has a cylindrical center section. The latter is adjoined by sections which are beveled conically on both sides. The bearing body is provided with a web which permits positionally accurate insertion of the bearings into the receptacle of a winch star and at the same time serves as antirotation safeguard. The bearing halves are connected elastically to one another by an integral hinge, a cutout being provided in an adjacent manner to the integral hinge, which cutout facilitates the widening of the bearing body, which is produced from a robust plastic, during mounting and dismantling. This solution concerns a hinge which can be bent more easily on account of the lower rigidity at a notched point.

U.S. Pat. No. 3,431,032 discloses a cylindrical bearing housing which has a milled slot as viewed in the axial direction. As a result, internal stresses which are produced are dissipated, such as residual stresses which are produced during casting. Deformation of the bearing housing is possible as a result of the slot.

DE 10 2004 053 078 A1 relates to a bearing arrangement. The latter comprises a bearing carrier which is connected to a bearing which is preferably configured as an antifriction bearing. In one of its bearing rings, the bearing has a groove which extends in the circumferential direction. At least one projection which is arranged on the bearing carrier and extends in the radial direction engages into said groove. At a circumferential point, the bearing carrier has a slot which extends substantially in the radial direction.

Finally, WO 03/081750 A1 discloses a generator for a vehicle, the generator comprising a support plate which has a slot which extends in the radial direction. Said slot which extends in the radial direction serves as tolerance compensation means. According to this solution, any stresses which possibly occur during the screwing connection of the support plate are dissipated, since a deformation of the material of the support plate is possible as a result of the slot and accordingly a dissipation of the stresses can take place.

SUMMARY OF THE INVENTION

The present invention is based on the object of protecting the components of the generator from excessive mechanical loadings, in particular excessively high oscillating accelerations, acting on the components of the generator for too long.

Following the solution which is proposed according to the invention, in an electric machine, for instance a generator which is used in the automotive sector, the support plate is configured in the region of the mounting in such a way that its macroscopic geometry changes during the operation of the generator. In particular, the change in the macroscopic geometry of the support plate is manifested by visible plastic deformations up to and including fractures of the support plate. The change in the geometry of the support plate achieves a situation where mechanical component loadings in the frequency range, for example, between 100 Hz and 500 Hz act for only a short time period on the components of the electric machine, for instance of a generator and for the most part are absorbed by the material of the support plate. To this extent, the material of the support plate acts as an absorber or damper, in particular for high mechanical oscillating accelerations.

The change in the macroscopic geometry of the support plate is achieved by the induced enforcement of fractures in the case of excessive loads as a result of defined predetermined break points. To this end, notches can be made at defined points of the support plate, which notches lead to high but locally delimited excessive loadings of the material of the support plate. If said delimited excessive loadings exceed a limiting value, this necessarily leads to the occurrence of a plastic deformation and, as a final consequence, to the formation of fractures. As a result of the support plates being partially or completely fractured at one or more points, the transmission of high mechanical component loadings to the components of the generator is avoided and damped or absorbed by the partially/completely fractured support plate.

In addition to the formation of notches at defined points of the support plate, plastic deformations can be forced in the support plate in the case of overloads, for instance also as a result of local rigidities, such as tapering regions of the support plate. This results in a reduction in the loading of the functionally important components of the support plate.

The support plate which is proposed according to the invention is designed, in particular, in such a way that at least one crack, that is to say a partial fracture or a complete fracture of the support plate, is produced in the case of more than 150,000 load changes with accelerations over 400 m/s$^2$. Accelerations of this type do not occur during the normal vehicle operation. In contrast, no fractures or cracks may be produced in the case of accelerations below 300 m/s$^2$. After the occurrence of at least one fracture in the support plate which is proposed according to the invention, the response characteristic of the generator changes, as a result of which the maximum load is reduced on account of damping effects which are produced.

Should the fracture faces not rub against one another after the fracture of the support plate, this is associated with a loss of friction energy. However, a completely fractured or partially fractured support plate will have a lower rigidity in comparison with an intact, that is to say unfractured, support plate. A reduced rigidity of the support plate leads to greater deformations of the latter and, as a result, additionally to damping potential which results in addition to the damping potential which exists at the fracture face. It is a further positive effect that the transmission characteristic of the generator can be influenced positively by the lower rigidity of the support plate. This effect is substantially independent of whether the fracture faces of the support plate rub against one another or whether this is not the case.

With regard to the pitch circle of the support plate screws, it is to be aimed for that it corresponds to the pitch circle of the holes which are formed in the support plate, that is to say the two pitch circles have identical dimensions.

In that design variant of the support plate proposed according to the invention which is provided with notches at defined points, it is to be aimed for that the geometry of the notch is designed in such a way that said notch has a stress concentration factor of $K_t > 2.0$.

BRIEF DESCRIPTION OF THE DRAWINGS

In the following text, the invention will be described in more detail using the drawing, in which:

FIG. 6 shows a horizontal sectional profile through the support plate, FIG. 7 shows a sectional profile in accordance with the sectional profile A-A which is shown in FIG. 6, FIG. 7a shows the plastic deformation which is produced in the sectional plane in accordance with the illustration in FIG. 7, FIG. 8 shows a vertical section through the support plate, FIGS. 9 and 9a show the illustration of fracture faces which are produced during the complete or partial fracture of the support plate which is proposed according to the invention, and FIGS. 10 and 10a show macroscopic geometry changes which are produced in the support plate which is proposed according to the invention, in the sectional plane of the section B-B in accordance with FIG. 8.

DETAILED DESCRIPTION

Figure 1:
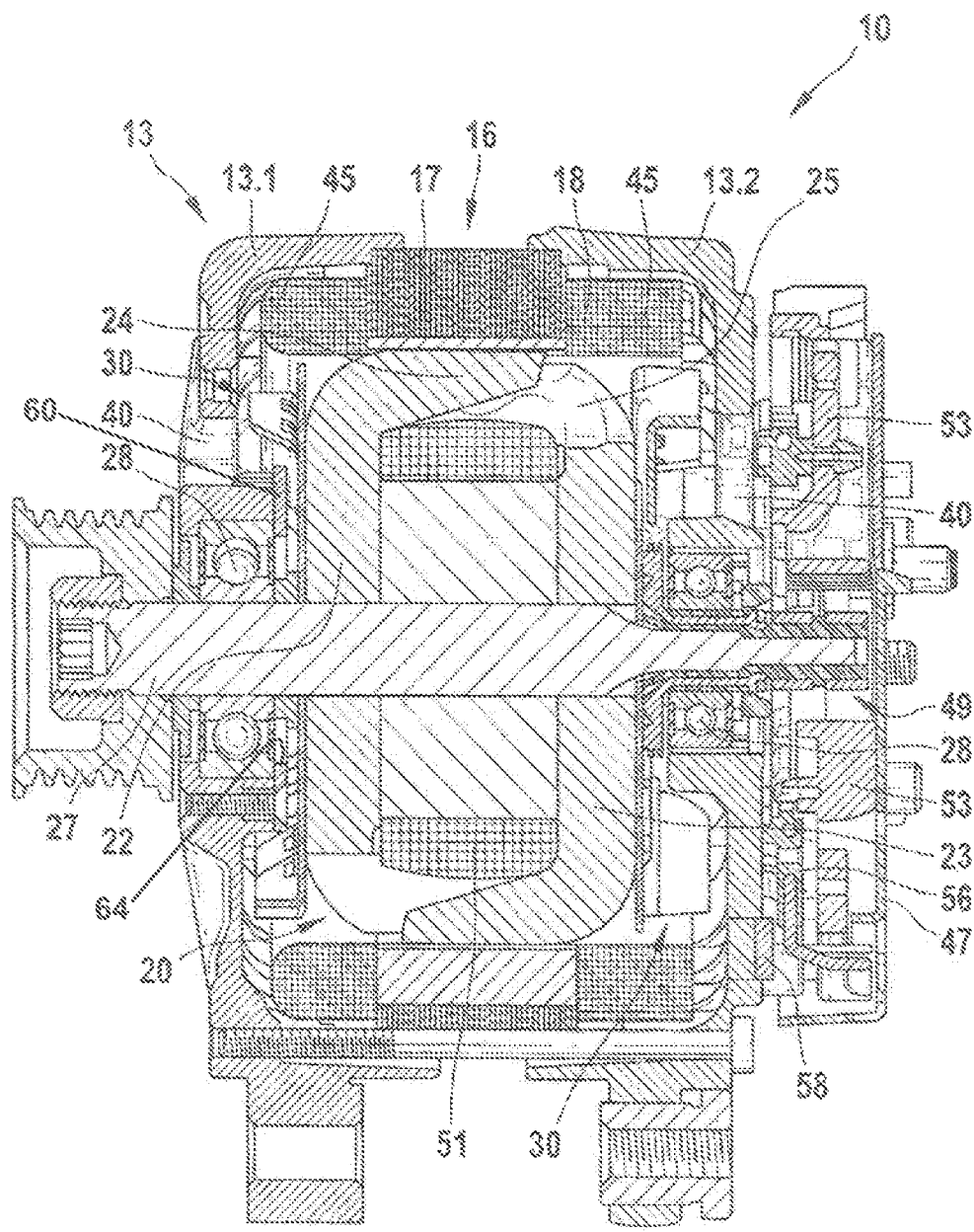
FIG. 1 shows a longitudinal section through a generator.

The illustration according to FIG. 1 shows a section through an electric machine 10, configured here as a generator or three-phase generator for motor vehicles. Said electric machine 10 has, inter alia, a two-part housing 13 which consists of a first bearing plate 13.1 and a second bearing plate 13.2. The first bearing plate 13.1 and the second bearing plate 13.2 receive a stator 16 between them, which stator 16 firstly consists of a substantially circularly annular stator iron 17 and in the radially inwardly directed, axially extending grooves of which a stator winding 18 is inserted. Said annular stator 16 surrounds a rotor 20 with its radially inwardly directed grooved surface, which rotor 20 can be configured as a claw pole rotor. The rotor 20 consists, inter alia, of two claw pole plates 22 and 23, on the external circumference of which claw pole fingers 24 and 25 which extend in the axial direction are arranged. The claw pole plates 22 and 23 are arranged within the rotor 20 in such a way that their claw pole fingers 24 and 25 which extend in the axial direction alternate one another on the circumference of the rotor 20. This results in magnetically required intermediate spaces between the oppositely magnetized claw pole fingers 24 and 25 which are called claw pole intermediate spaces. The rotor 20 is mounted rotatably in the first and second bearing plates 13.1 and 13.2 by means of a shaft 27 and in each case one antifriction bearing 28 which is situated on in each case one rotor side.

The rotor 20 has a total of two axial side faces, to which in each case one ventilator 30 is fixed. Said ventilator 30 consists substantially of a plate-shaped or disc-shaped section, from which ventilator vanes emanate in a known manner. The ventilator 30 serves to make an exchange of air possible via openings 40 in the bearing plates 13.1 and 13.2 between the outer side of the electric machine 10 and the interior of the electric machine 10. To this end, the openings 40 are provided substantially at the axial ends of the bearing plates 13.1 and 13.2, via which openings 40 cooling air is sucked into the interior of the electric machine 10 by means of the ventilator 30. Said cooling air is accelerated radially to the outside by the rotation of the ventilator 30, with the result that said cooling air can pass through the winding projection 45 which is permeable to cooling air. The winding projection 45 is cooled by this effect. After passing through the winding projection 45 or after flowing around said winding projection 45, the cooling air follows a path radially to the outside, through an opening which is not shown in FIG. 1.

Furthermore, it is apparent from the illustration in accordance with FIG. 1 that a protective cap 47 which protects various components against environmental influences is situated on the right hand side. Thus, for example, this protective cap 47 covers a slip ring assembly 49 which serves to supply an exciter winding 51 with exciter current. A cooling body 53 which acts here as a positive cooling body is arranged around said slip ring assembly 49. The second bearing plate 13.2 acts as what is known as a negative cooling body. A connecting plate 56 is arranged between the second bearing plate 13.2 and the cooling body 53, which connecting plate 56 serves to connect negative diodes 58 which are arranged in the bearing plate 13.2 and positive diodes (not shown here in this illustration) in the cooling body 53 to one another and therefore to realize a bridge circuit which is known per se. A support plate of the electric machine 10 is denoted by designation 60 in FIG. 1.

Figure 2:
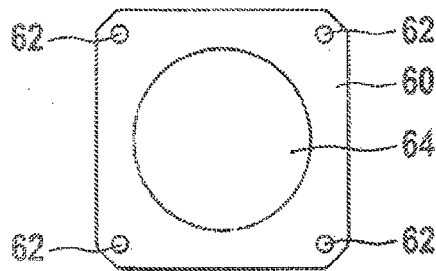
FIG. 2 shows the plan view of a conventionally configured support plate.

A support plate in accordance with the prior art which is used on an electric machine can be gathered from the illustration in accordance with FIG. 2.

The support plate 60 which can be of rectangular, round or, as shown in FIG. 2, square configuration comprises a through opening 64 and a number of fastening openings 62. The fastening openings 62 can be produced as punched holes, as drilled holes with or without threads, or the like. The antifriction bearings 28 which are shown in section in accordance with FIG. 1 are fixed in the housing of the electric machine 10 by way of the support plate 60 in accordance with the illustration in FIG. 2. It is apparent from the illustration in accordance with FIG. 2 that the support plate 60 which is shown there is of planar configuration in relation to its outer and its inner borders.

Figure 3:
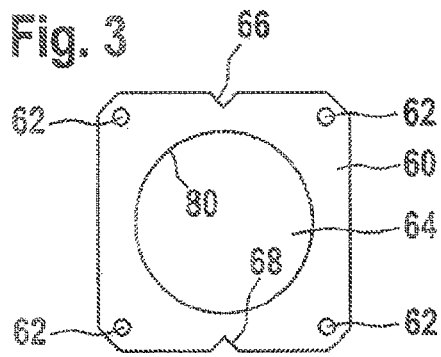
FIG. 3 shows a first design variant of the support plate which is proposed according to the invention.

FIG. 3 shows a support plate which is proposed according to the invention and is illustrated in a first design variant.

It is apparent from the illustration in accordance with FIG. 3 that the opening 64 has an internal diameter 80 and contains a number of fastening openings 62. A first outer notch 66 and a second outer notch 68 which lies opposite the former are situated in each case in a 6 o'clock arrangement and 12 o'clock arrangement on the outer edge of the support plate 60 in accordance with the illustration in FIG. 3. The first outer notch 66 and the second outer notch 68 could also be configured to be turned by 90°, that is to say could be configured in the 3 o'clock and the 9 o'clock arrangement. Two outer notches 66, 68 which lie opposite one another are preferably formed on the support plate 12 in its first embodiment.

Figure 3A:
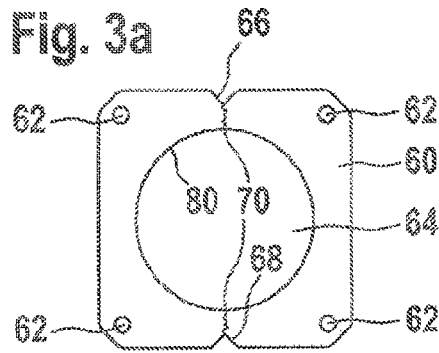
FIG. 3a shows the changing macroscopic geometry of the support plate in accordance with the first embodiment according to FIG. 3.

As is apparent from the illustration in accordance with FIG. 3a, cracks 70 which run from the notch bottom of the first and/or the second outer notch 66 and/or 68 inward toward the internal diameter 80 are produced during operation of the generator and during mechanical loading of the support plate 60. Said cracks 70 represent a macroscopic change in the geometry of the support plate 60 and convert the mechanical loadings into precisely the cracks 70, with the result that loading peaks can be absorbed not by the components of the electric machine 10 in accordance with the illustration in FIG. 1, but rather substantially by the support plate 60.

The support device 60 is preferably configured to be plate-shaped, that is to say as a support plate.

It is to be noted in relation to the cracks 70 which extend from the notch bottom of the outer notches 66 and 68 in the radial direction toward the internal diameter 80 of the central opening 64 that the faces which delimit the crack 70 are relatively rough and brittle and accordingly do further damping work in the context of the present invention by rubbing on one another and accordingly absorbing oscillating accelerations with the acceptance of a slight temperature increase.

Figure 4:
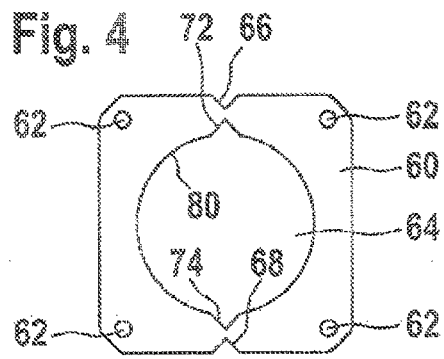
FIG. 4 shows a further, second possible embodiment of the support plate which is proposed according to the invention.

A further, second design variant of the support device which is proposed according to the invention and is configured to be, in particular, plate-shaped can be gathered from the illustration in accordance with FIG. 4.

FIG. 4 shows that, in addition to the first outer notch 66 and the second outer notch 68 on the external circumference of the plate-shaped support device 60, notches which lie opposite one another, that is to say a first inner notch 72 and a second inner notch 74, are also configured on the internal diameter 80 of the central opening 64. In an analogous manner to the first outer notch 66 in the 12 o'clock position, the first inner notch 72 is likewise situated in the 12 o'clock position on the internal diameter 80 of the central opening 64. The same applies to the second inner notch 74 which, analogously to the second outer notch 68, is situated in the 6 o'clock position on the internal diameter 80 of the central opening 64. It goes without saying that both the inner notches 72, 74 and the outer notches 66 can be arranged in each case turned by 90° with respect to one another.

Figure 4A:
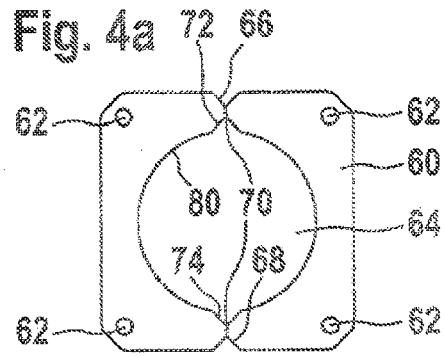
FIG. 4a shows the change which is produced in the macroscopic geometry of the support plate in accordance with the second embodiment according to FIG. 4.

FIG. 4a shows the crack pattern which is produced of the cracks 70 in the case of mechanical loading of the support device 60 which is proposed according to the invention and is preferably configured to be plate-shaped. On account of the small remaining material web between the notch bottoms which face one another of the first outer notch 66 and the first inner notch 72 and the second outer notch 68 and the second outer notch 74, relatively short cracks 70 extend, as indicated in FIG. 4a, between the notch bottoms which in each case point toward one another.

The faces which are produced and delimit the cracks 70 have a relatively high roughness, which is favorable with regard to additional damping work, via which oscillating accelerations can be dissipated.

Figure 5:
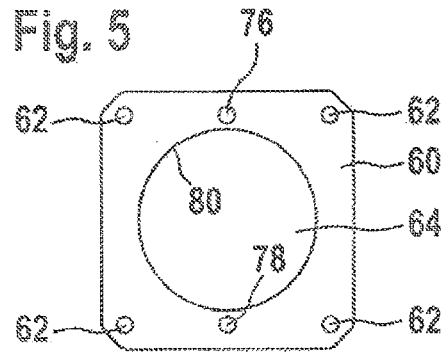
FIG. 5 shows a further, third possible embodiment of the support plate which is proposed according to the invention.
Figure 5A:
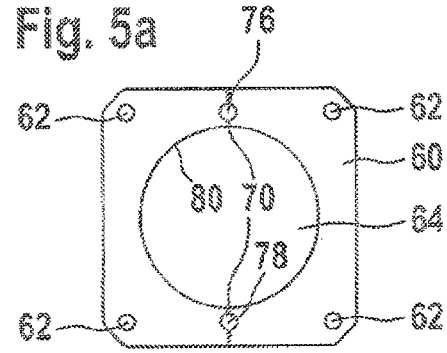
FIG. 5a shows the changing macroscopic geometry of the third embodiment (shown in FIG. 5) of the support plate which is proposed according to the invention.

A further, third design variant of the support device 60 which is proposed according to the invention and is configured to be, in particular, plate-shaped can be gathered from the illustration in accordance with FIG. 5. In contrast to the first design variant and the second design variant in accordance with FIG. 4, the support device 60 which is proposed according to the invention and is configured to be plate-shaped has, in accordance with FIG. 5, shell-shaped openings 76, 78 which are oriented so as to lie opposite one another in the solid material of the support device 60. This results in material webs which extend in each case from the ends of the openings 76 and 78 and extend in the radial direction both to the external circumference of the support device 60 which is configured to be plate-shaped and also to the internal diameter 80 which delimits the central opening 64. Excessive loadings are produced in said remaining, relatively short material sections in the case of mechanical loading of the support device 60 which is proposed according to the invention, on account of oscillating accelerations which occur, which excessive loadings lead to the crack courses 70 which are shown in FIG. 5a, firstly in the direction of the external circumference and the support device 60 and secondly in the direction of the internal diameter 80 of the central opening 64.

Fastening openings 62 are a common feature of all the design variants in accordance with FIGS. 3 to 5 of the support device which is proposed according to the invention and is configured to be, in particular, plate-shaped. Said fastening openings 62 can be simply punched holes, or they can be drilled holes which are configured with or without internal threads. The pitch circle diameters both of the pitch circle of the fastening openings 62 and also that of the screws which penetrate the fastening openings 62 are preferably identical.

An illustration of the support device 60, in which a horizontal sectional profile A-A is represented, can be gathered from the illustration in accordance with FIG. 6.

FIGS. 7 and 7a show the support device 60 in the sectional plane A-A, which support device 60 is shown in FIG. 6 with the sectional profile A-A, is proposed according to the invention and is configured to be, in particular, plate-shaped. It is apparent from the sectional illustration in accordance with FIG. 7 that, in the region of the central opening 64, the support device 60 has a reduced thickness 84 in relation to its thickness 82, that is to say a tapered section 84. The tapered region 84 which adjoins the central opening 64 of the support device 60 which is configured to be, in particular, plate-shaped results in webs 86 which lie opposite one another and experience a plastic deformation 88 in the case of a mechanical loading of the support device 60 which is configured to be, in particular, plate-shaped, as is shown in FIG. 7a.

The plastic deformation 88 (shown in FIG. 7a) of those ends of the webs 86 which lie opposite one another represents a macroscopic change in the geometry of the support device 60 which is configured to be plate-shaped, by way of which change the stresses can be dissipated which are produced in the support device 60 which is configured to be plate-shaped in the case of mechanical loading of the latter, and accordingly a complete fracture or a partial fracture is accepted of the support device 60 which is configured to be, in particular, plate-shaped, in order as a result to protect the components of the electric machine 10 in accordance with the sectional illustration in FIG. 1 against excessive mechanical loadings in the frequency range mentioned.

FIG. 8 shows a sectional profile A-A, B-B. FIG. 9 shows the profile through the support device 60 before the fracture, whereas FIG. 9a represents the sectional profile after the occurrence of a fracture in the support device 60 which is proposed according to the invention.

A sectional profile B-B in accordance with the sectional illustration in FIG. 8 can be gathered from FIGS. 10 and 10a. According to the sectional profile B-B as shown in FIG. 10, a planar-side notch 92 is made on one of the planar sides 94 and 96 of the support device 60 which is configured to be, in particular, plate-shaped. As a result, a reduced thickness is produced between the notch bottom of the planar-side notch 92 and the planar side 94 which lies opposite it. A crack 70, as indicated in the illustration in accordance with FIG. 10a, extends precisely in this reduced thickness in the case of mechanical overloading of the support device 60 which is proposed according to the invention and is preferably configured to be plate-shaped. The crack 70 extends from the notch bottom of the planar-side notch 92 to the planar side 96. As an alternative to the position (shown in FIGS. 10 and 10a) of the planar-side notch 92 on the first planar side 94, it goes without saying that the planar-side notch 92 can also be formed on the opposite second planar side 96 of the support device 60 which is proposed according to the invention and is configured to be, in particular, plate-shaped.

It is to be noted with respect to FIGS. 3, 4, 5 and 10 that the notches which are shown there, whether they are outer notches 66, 68, inner notches 72, 74 or planar-side notches 92, are all preferably configured with a stress concentration factor of $K_t > 2.0$. The stress concentration factor $x_{Kt}$ is defined as the quotient from maximum loading and nominal loading.

In the embodiments shown in FIGS. 3, 4, 5, 7 and 9 of the support device 60 which is proposed according to the invention and is configured to be, in particular, plate-shaped, it is to be noted that the geometry of said support device is configured in such a way that the support device 60 fractures when more than 150 000 load changes at accelerations over 400 m/s$^2$ occur. The support device 60 which is proposed according to the invention and is configured to be, in particular, plate-shaped is preferably dimensioned in such a way that it does not fracture in the case of accelerations below 300 m/s$^2$. After the fracture or partial fracture of the support device 60 which is proposed according to the invention as a result of at least one crack 70 occurring, the response characteristic of the electric machine 10 changes, as a result of which the maximum load is reduced by way of damping effects.

If the fracture faces 90 which are shown in FIG. 9a no longer rub against one another after the fracture, part of the friction energy, in which energy is dissipated, is lost. However, a fractured or partially fractured support device 60 will have a lower rigidity than an intact support device 60. A reduced rigidity of the support device 60 in turn leads to somewhat greater plastic deformations 88, as is shown in an exaggerated manner in FIG. 7a, and additionally leads, as a result, to damping which is to be considered to be additional damping in relation to the damping which can be achieved by way of the fracture faces 90.

What is claimed is:

1. A method for fixing a bearing (28) in an electric machine (10) to limit oscillating accelerations during operation of the electric machine (10), the method comprising:

providing a support plate (60) with a flat shape and at least one notch (66, 68; 72, 74; 76, 78; 92), the support plate (60) having a plurality of fastening openings (62) disposed around a central opening (64);

coupling the support plate (60), having the at least one notch (66, 68; 72, 74; 76, 78; 92) already formed therein, to a bearing plate (13.1, 13.2) of a housing (13) of the electric machine (10), in which a rotor (20) with a shaft (27) is rotatably mounted, the support plate (60) being fastened to the bearing plate (13.1) via the plurality of fastening openings (62) and a corresponding plurality of fasteners to secure the bearing (28) within a mount in the bearing plate (13.1); and operating the electric machine (10) such that oscillations of the rotor (20) act on the support plate (60), whereby a crack (70) is formed and as a result the support plate (60) at least partially fractures at the notch, characterized in that, during formation of the crack (70), surfaces arise that delimit the crack (70) and said surfaces rub against each other and damping work is thereby performed.

2. The method according to claim 1, characterized in that the at least one notch includes a notch (92) provided on a planar side (94, 96) of the support plate (60).

3. The method according to claim 1, characterized in that the at least one notch includes a notch (66, 68) provided on an outer edge of the support plate (60).

4. The method according to claim 1, characterized in that the at least one notch includes a plurality of notches provided on one or both of an outer edge of the support plate (60) and an inner diameter (80) of the central opening (64) of the support plate (60).

5. The method according to claim 4, characterized in that the plurality of notches includes at least two notches provided in diametric opposition on the outer edge of the support plate (60).

6. The method according to claim 4, characterized in that the plurality of notches includes at least two notches provided in diametric opposition on the inner diameter (80) of the central opening (64).

7. The method according to claim 1, further comprising, providing the support plate (60) with a taper (84) in which taper webs (86) extend, and plastically deforming the taper webs (86) during operation of the electric machine (10).

8. The method according to claim 1, characterized in that the at least one notch has a diametral quotient $Kt > 2.0$.

9. The method according to claim 1, characterized in that a rigidity of the support plate (60) is reduced by the at least partial fracture of the support plate (60) during operation of the electric machine (10), and the support plate (60) further deforms more severely.

* * * * *